April 3, 1962  A. F. W. PARR ET AL  3,028,592

DOPPLER INERTIAL NAVIGATION DATA SYSTEM

Filed June 27, 1957  5 Sheets-Sheet 1

INVENTORS
ALBERT F. W. PARR
LEWIS M. LAWTON, JR.
BY LESTER I. GOLDFISCHER

ATTORNEY.

April 3, 1962    A. F. W. PARR ET AL    3,028,592
DOPPLER INERTIAL NAVIGATION DATA SYSTEM
Filed June 27, 1957    5 Sheets-Sheet 2

INVENTORS.
ALBERT F. W. PARR
LEWIS M. LAWTON, JR.
BY LESTER I. GOLDFISCHER

ATTORNEY.

United States Patent Office

3,028,592
Patented Apr. 3, 1962

3,028,592
DOPPLER INERTIAL NAVIGATION DATA SYSTEM
Albert F. W. Parr, Valhalla, Lewis M. Lawton, Jr., Armonk, and Lester I. Goldfischer, New Rochelle, N.Y., assignors to General Precision, Inc., a corporation of Delaware
Filed June 27, 1957, Ser. No. 669,908
11 Claims. (Cl. 343—8)

This invention relates to self contained vehicle navigation systems.

Self contained navigation systems receive as inputs the various motions and changes of motion of the vehicle and derive therefrom data indicative of both the speed and direction of travel of the vehicle with respect to the earth. Examples of systems which have been used in the past are Doppler radar systems and inertial systems.

Doppler radar systems are usually arranged to transmit two or more beams of radiant energy from the vehicle at different angles and to receive a portion of the energy after reflection from the earth. Motion of the vehicle relative to the earth causes the frequency of the received energy to deviate from that of the transmitted energy, and by measuring and comparing the frequency shifts of the various beams, the ground speed and the drift angle (the angle between the horizontal projections of the velocity vector and the longitudinal axis) of the vehicle can be determined. The nature of the reflection process causes the frequency of the returned signal to fluctuate rapidly and erratically thus leading to large errors in the instantaneous indications of ground speed and drift angle. However, Doppler systems are capable of very high accuracy if the data be averaged over a period of, say, several minutes, and the accuracy does not deteriorate with the passage of time.

Inertial systems may comprise a gyroscopically stabilized horizontal platform on which are mounted two accelerometers so that they measure accelerations in orthogonal directions in the plane of the platform. The accelerations so measured can be integrated to obtain velocities which can in turn be resolved to determine ground speed and drift angle. The accuracy of such systems depends, among other things, upon the horizontality of the platform since the accelerometers cannot distinguish between accelerations caused by motion of the vehicle relative to the earth and the acceleration due to gravity. Even if the platform originally were erected to exact horizontality it would deviate therefrom after a time because of the inherent random drift of the gyroscopes used for stabilization. Inertial systems as above described are thus seen to have the disadvantage that their accuracy deteriorates rapidly with the passage of time although the instantaneous, or short time, accuracy is excellent.

Doppler and inertial systems are thus seen to have complementary advantages, that is, the former has excellent long term accuracy while the latter has excellent short term accuracy. Stated another way, Doppler systems have good response to low frequency fluctuations of input data while inertial systems have good response to high frequency fluctuations of input data. One factor affecting the accuracy of both systems is the need for accurate knowledge of the vertical direction. This knowledge is required in Doppler systems in order to determine the angular position of the transmitted beams, although recent developments in the art of linear array antennas have relaxed the requirements somewhat. In the case of inertial systems there is a stringent requirement for knowledge of the vertical because the platform must be exactly horizontal if the accelerometers are not to interpret the acceleration of gravity as a horizontal acceleration.

It has been proposed in the past to combine Doppler and inertial components and it has been found that a composite system not only utilizes fully the advantages of each system but in addition yields greater accuracy in the crossover region than can be obtained with either system alone. A by-product of such a system is an accurate indication of the vertical direction. One such combined system is described in the copending application Serial No. 390,338 of Ivan A. Greenwood, Jr. and France B. Berger filed November 5, 1953, for Doppler Inertial Navigation Data System, now Patent No. 2,914,763. While that system produces satisfactory results it can be improved by more intimately interconnecting the Doppler and inertial components and by providing several modes of operation so that the system may be brought into operation more quickly and so that it can operate with some of the advantages of both systems even although one system be temporarily inoperative.

It is a general object of the present invention to provide a navigation system having the advantages of both Doppler and inertial systems.

Another object is to provide a Doppler inertial system which can be brought into proper operation quickly.

Another object is to provide a Doppler inertial system capable of continuing in operation in spite of temporary interruptions in the operation of a portion of the system.

Briefly stated, the invention comprises a Doppler system including a frequency tracker and an inertial system including two accelerometers mounted on a gyroscopically stabilized platform. Several modes of interconnection and operation are provided. First, the accelerometers are connected to torque the gyros so as to erect the platform quickly. Second, the Doppler system and the inertial system each operate independently to determine ground speed and drift angle. The values as determined by the two systems are compared and error signals are generated which, through suitable damping and tuning circuits, control the platform stabilization equipment. In the third or normal mode of operation the Doppler and inertial systems are intimately interconnected. A signal representing inertially determined ground speed controls the local oscillator of the frequency tracker while the antenna is positioned by inertially determined drift angle data. Error signals generated by the frequency tracker control the stabilization of the platform through damping and tuning circuits. Finally, the error signals generated in the normal mode are integrated and stored. Upon inoperativeness of the Doppler system for any reason, these stored error signals, representing principally gyro drift rates, are used to control the gyroscopic stabilization system.

For a clearer understanding of the invention reference may be made to the following detailed description and the accompanying drawing in which.

The invention may be used with land vehicles or marine vessels but is particularly suitable for use with aircraft and will be described in that connection.

The Platform

Figures 1, 3:
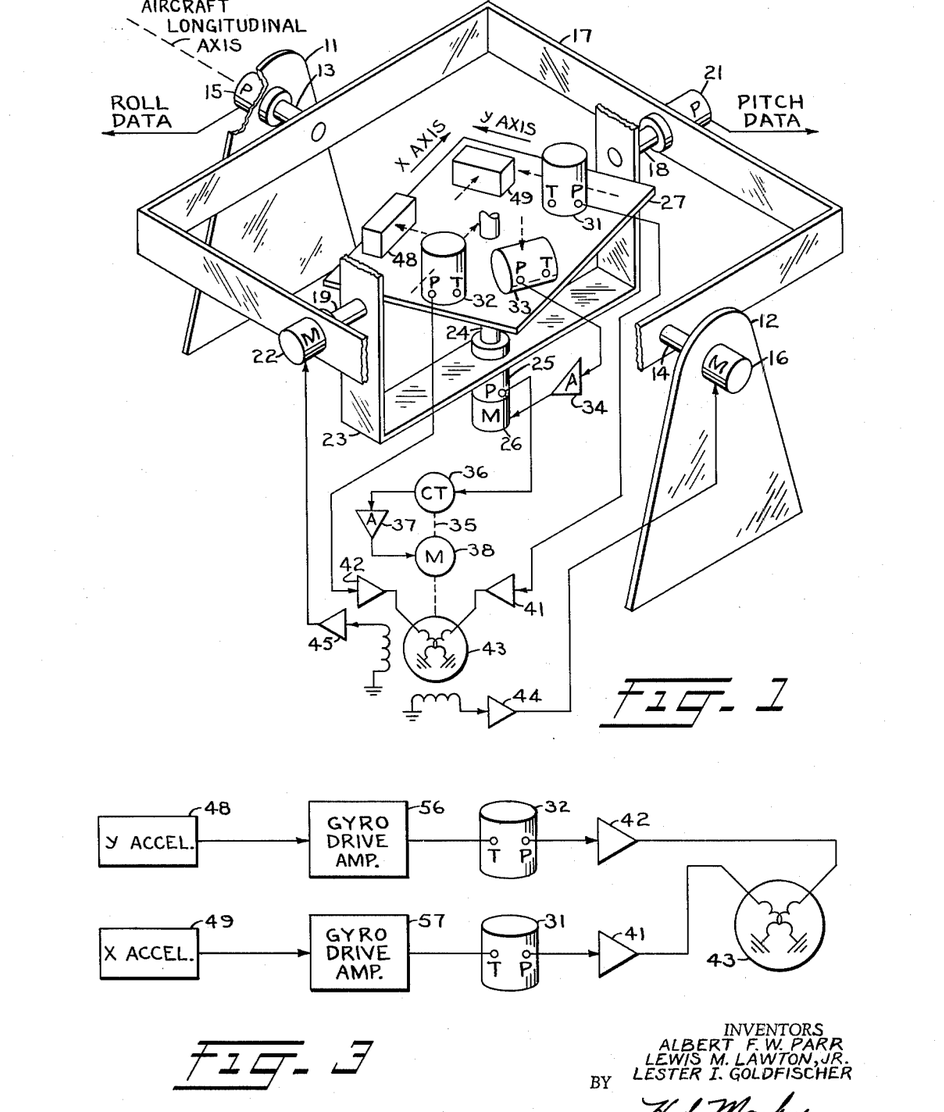
FIGURE 1 is a view of the horizontal platform and the inertial components.
FIGURE 3 is a diagram showing the circuit connections for the rapid mode of operation.

Referring first to FIG. 1, there are shown two uprights 11 and 12 fastened to the frame of the aircraft for supporting the gimbal structure and its platform. Collinear shafts 13 and 14 are journaled in uprights 11 and 12 respectively with their common axis parallel to the longitudinal axis of the aircraft. The shaft 13 is connected to the rotor of a pickoff device 15, such as a synchro transmitter, the stator of which is fastened to the upright 11. The shaft 14 is fastened to the rotor of a motor 16 the stator of which is fastened to the upright 12. The shafts 13 and 14 are fastened to opposite ends of a normally horizontal gimbal ring 17 in which are journaled two collinear shafts 18 and 19 with their common axis normal to the longitudinal axis of the aircraft. Shafts 18 and 19 have one end connected to the rotors of a pickoff device 21 and a motor 22 respectively, the stators of which are fastened to the gimbal ring 17, and have their other ends fastened to a normally vertical gimbal ring 23. This ring, although shown broken away in the drawing, is preferably a full ring and has a normally vertical shaft 24 journaled in both its upper and lower portions. A pickoff device 25, which may be a synchro transmitter, and a motor 26 have their stators fastened to the gimbal ring 23 and their rotors fastened to the shaft 24. A platform 27 is fastened to the shaft 24 at right angles thereto.

It is obvious that the platform 27 can be maintained at the same azimuth and in a horizontal plane regardless of the attitude of the aircraft (within limits) by suitably energizing the motors 16, 22 and 26. In the present invention it is desired to keep the platform exactly horizontal and to prevent rapid changes in azimuth. The primary stabilization system is shown in FIG. 1 and additional control circuits will be described with the aid of the other figures of the drawing.

As shown in FIG. 1, the platform 27 carries three gyroscopes 31, 32 and 33. Each gyroscope may, for example, be a rate integrating floated gyroscope in which the rotor is supported within an inner cylindrical case with the spin axis perpendicular to the cylindrical axis. The inner case is surrounded by an outer cylindrical case and the space between the cases is filled with a fluid of suitable specific gravity so that the inner case is supported in neutral buoyance. In such an instrument the output axis coincides with the cylindrical axis while the input axis is perpendicular to both the spin axis and the output axis. The gyroscope is thus seen to be sensitive to any torque having a component tending to rotate the case about the input axis and responds to such a torque by precessing about the output axis.

The input axis of each gyroscope is indicated by a dashed arrow and, as can be seen, the input axis of gyroscope 31 is parallel to one dimension of the platform, designated as the y axis or as the reference direction; the input axis of gyroscope 32 is parallel to the other dimension of the platform, designated as the x axis; and the input axis of the gyroscope 33 (the azimuth gyroscope) is perpendicular to the platform.

Each gyroscope is provided with a pickoff device about its output axis which generates an electrical signal indicative of the time integral of the rate of rotation about the input axis. Each gyroscpe is also provided with a torquer to allow the application of torques to the output axis. In the drawing the pickoffs and the torquers are indicated schematically by terminals marked P and T respectively.

The azimuth gyroscope 33 having its input axis normal to the platform 27 senses changes in azimuth. In the particular instrumentation being described, the actual azimuth of the y axis is fortuitous and changes in azimuth during operation have no effect provided only that the changes are not too rapid to be followed readily. Azimuth is maintained substantially constant by connecting the pickoff of gyroscope 33 to a suitable servo amplifier 34 which controls the motor 26 on the shaft 24. The angular position of shaft 24 represents the angle between the y axis or reference direction of the platform and the longitudinal axis of the aircraft and this angle must be made available to other portions of the apparatus. The angular position of shaft 24 is therefore repeated as the position of a shaft 35 by means of a conventional position servo mechanism comprising the pickoff 25 (a synchro transmitter), a synchro control transformer 36, a servo amplifier 37 and a motor 38.

The gyroscopes 31 and 32 sense rotations about the y and x axes respectively and their pickoff devices therefore generate signals whenever the platform 27 tilts. These signals cannot be used directly to level the platform because the y axis is not, in general, parallel to the longitudinal axis of the aircraft and therefore the pickoff devices of gyroscopes 31 and 32 are connected through amplifiers 41 and 42 to the rotor windings of an inductive resolver 43 the rotor of which is positioned by the shaft 35. The stator windings thus bear coordinate rotated error signals which are passed through amplifiers 44 and 45 to the motors 16 and 22 thereby leveling the platform.

It is apparent that if the platform 27 were initially made horizontal the apparatus above described would tend to keep it so. However, the platform would eventually depart from horizontality because of the rotation of the earth, the motion of the aircraft with respect to the earth, and the random drift rates inherent in all gyroscopes. The effect of these factors is made exceedingly small by the remaining apparatus described in connection with other figures of the drawing.

The purpose of maintaining the platform horizontal is to provide a support for two accelerometers so that they may sense aircraft accelerations only and not the acceleration of gravity. Accelerometers 48 and 49 are mounted so as to sense accelerations in the y and x directions respectively, as indicated by the dashed arrows. Each accelerometer may comprise an inverted pendulum free to move in one plane having its mass made of a magnetic material and having associated with it a pickoff device such as an E transformer in which is induced an alternating voltage the phase and magnitude of which are indicative of the sense and magnitude of the displacement of the mass. In order to derive a voltage proportional to acceleration, the induced voltage is amplified and synchronously detected thereby deriving a unidirectional voltage which is used to excite a pair of solenoids which magnetically attract the mass in such a direction as to return the mass to its neutral position. The displacement of the mass is thus kept small and the current through the solenoids is proportional to the acceleration force acting on the mass. The output is a voltage proportional to this current.

Other kinds of accelerometers may, of course, be used, one suitable kind being a two axis accelerometer in which a single mass is free to move in two orthogonal planes and which is equipped with two sets of solenoids and pickoff devices. For the purpose of explaining the present invention it will be sufficient to assume that the accelerometers provide two unidirectional output voltages the polarities and magnitudes of which represent the sense and amount of acceleration in the x and y directions respectively. The electrical connections of the accelerometers will be discussed in connection with the remaining figures of the drawing.

The Coordinate Systems

There are three sets of horizontal rectangular coordinates which must be considered in the instrumentation of the present invention. These are, first, the coordinates of platform 27 comprising the y axis or reference direction and the $x$ axis perpendicular thereto; second, the coordinates of the aircraft comprising the longitudinal axis of the craft (the roll axis) and the transverse axis (the pitch axis); and third, the coordinates of the direction of travel of the aircraft comprising the ground track direction and a line perpendicular thereto sometimes referred to as cross track. The angular relationship between these sets of axes is shown in FIG. 2.

Figures 2, 4, 5:
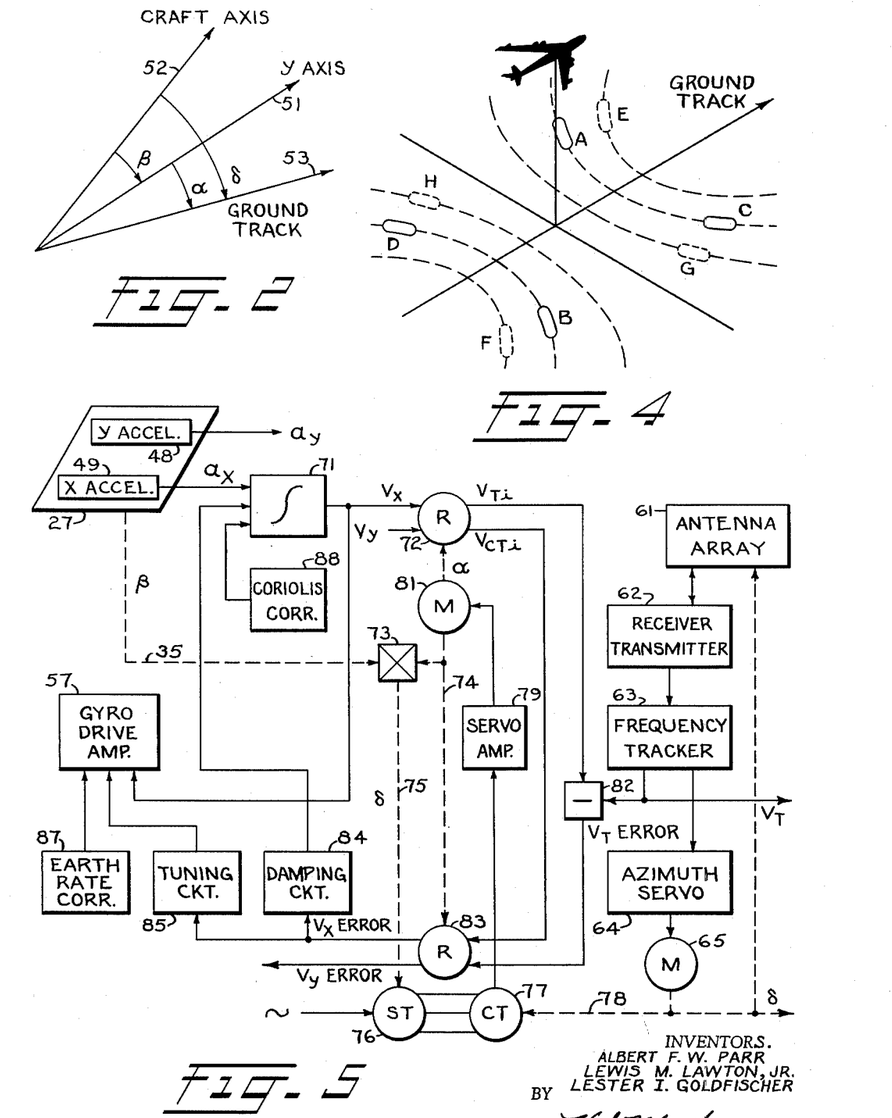
FIGURE 2 is a diagram showing various angular relationships.
FIGURE 4 is a diagram showing the beams transmitted by the Doppler system.
FIGURE 5 is a diagram showing the circuit connections for the set-up mode of operation.

Referring now to FIG. 2, there is shown an arrow 51 representing the $y$ axis of the platform, an arrow 52 representing the longitudinal axis of the aircraft, and an arrow 53 representing the direction of the ground track. The drift angle, $\delta$, is measured from the craft axis to the ground track; the angle $\beta$ is measured from the craft axis to the $y$ axis of the platform; and the angle $\alpha$ is measured from the $y$ axis to the ground track. Clockwise angles are regarded as positive. From the geometry of the figure it can be seen that $\alpha = \delta - \beta$.

The operation of the invention in the rapid, set up and normal modes will be described with the aid of the separate functional block diagrams shown in FIGS. 3, 5, and 6. It will be understood that these diagrams are somewhat simplified in order to emphasize the function of the components rather than the details of the instrumentation. FIGS. 7a and 7b show a more complete schematic diagram of the system.

*Rapid Mode*

When the apparatus has been out of use for some time, as, for example, while the aircraft is on the ground with all power shut off, the platform 27 may be in any position whatever. In order to erect the platform quickly to approximate horizontality, the "Rapid" mode connections are made as shown in FIG. 3. The accelerometer 48, as can be seen by reference to FIG. 1, is sensitive to tilting of the platform 27 about the $x$ axis as well as to aircraft accelerations in the $y$ axis direction. Similarly, the accelerometer 49 is sensitive to tilting of the platform about the $y$ axis as well as to aircraft accelerations in the $x$ axis direction. Therefore if the aircraft is at rest or is moving at a constant speed, the accelerometers can be used to erect the platform. The output of the accelerometer 48 is connected to the input of a gyro drive amplifier 56 the output of which is connected to the torquer of gyroscope 32. The applied torque causes the pickoff of the gyroscope 32 to generate an error signal which is amplified by the amplifier 42 and passed to the resolver 43. Similarly, the output of the accelerometer 49 is passed through a gyro drive amplifier 57 to the torquer of gyroscope 31. The error signal generated by the pickoff of gyroscope 31 is passed through amplifier 41 to the resolver 43. The resolver 43 rotates the coordinates of the error signals from the platform axes to the aircraft axes and, by means of the circuitry shown in FIG. 1, the platform is levelled. Once the platform is level, the circuit configuration may be altered so as to determnie ground speed and drift angle.

*The Doppler Signal*

Before explaining the set up and normal modes of operation, the nature of the Doppler signal should be considered briefly. Various antenna beam configurations and various kinds of signals can be used in the present invention but one particular system which is widely used has been selected for illustrative purposes.

Referring now to FIG. 4, there is shown the ground track (the horizontal projection of the velocity vector) of an aircraft in flight. The aircraft carries suitable equipment for forming alternately two pairs of beams, the two beams of the first pair being directed forward left and aft right so as to illuminate ground areas A and B while the two beams of the second pair are directed forward right and aft left so as to illuminate the ground areas C and D. It is obvious that the energy received at the aircraft after reflection from areas A and C will be shifted upward in frequency while that received after reflection from areas B and D will be shifted downward. If the antenna array is aligned with the ground track so that the illuminated areas are located symmetrically with respect to the ground track, as illustrated, the difference in frequency between the energy returned from area A and that returned from area B will be equal to the difference in frequency between the energy returned from area C and that returned from area D, and this difference in frequency will be proportional to the ground speed of the aircraft. However, if the antenna array is rotated about a vertical axis, the illuminated areas will not be symmetrically located and will be at some other positions such as E, F, G and H. The dashed lines represent isodops, or constant frequency shift contour lines, and it can be seen that the difference in frequency between the energy returned from area E and that returned from area F will not be the same as the difference in frequency between the energy returned from area G and that returned from area H. Therefore, the sense and magnitude of the difference $(f_E - f_F) - (f_G - f_H)$ will be an indication of the direction and amount of the deviation of the antenna array from the ground track direction.

The frequency of alternation between the two pairs of beams is not critical but will be assumed for illustrative purposes to be one cycle per second. The receiver is time shared between the fore left—aft right and the fore right—aft left beams and is arranged to derive signals representing the difference in frequency between the returned beams of each pair. That is, during the first half of each cycle, the output of the receiver is the difference in frequency between the fore left return and the aft right return while during the second half of each cycle the output is the difference in frequency between the fore right return and the aft left return. In the usual Doppler system, a frequency tracker is employed to accept the output of the receiver and to derive therefrom a signal representing ground speed and an error signal for positioning the antenna. In the set up mode of the present invention the frequency tracker performs these functions but in the normal mode the operation is somewhat different.

*Set Up Mode*

Referring now to FIG. 5 there is shown an antenna array 61 for transmitting and receiving microwaves in the four beam pattern previously described. A receiver-transmitter 62 furnishes the microwave energy and receives a portion of the transmitted energy after reflection from the surface of the earth. The receiver output comprises two voltages time shared on a single channel, the first having a frequency equal to the difference in frequency between the fore left and aft right returns and the second having a frequency equal to the difference in frequency between the fore right and aft left returns. A frequency tracker 63 accepts the output of the receiver and generates two signals, the first indicative of ground track speed, $V_T$, and the second an error signal indicative of the deviation of the antenna from alignment with the ground track. The latter error signal is led to an azimuth servo mechanism 64 which controls a motor 65 which, in turn, positions the antenna. An output indicative of $V_T$ may be taken from the frequency tracker and an output indicative of drift angle, $\delta$, may be taken from the motor shaft.

In FIG. 5 there is also shown the platform 27 and the two accelerometers 48 and 49. The latter is sensitive to aircraft accelerations in the direction of the $x$ axis and is connected to an integrating circuit 71 the output of which is a voltage proportional to aircraft velocity in the $x$ direction, $V_x$. This voltage is connected to one input of the gyro drive amplifier 57 in order to precess the gyro 31 slightly so as to keep the platform horizontal as the aircraft flies over the earth's curved surface. This voltage is also connected to one input terminal of a resolver 72. Similarly, the accelerometer 48 is connected to another integrating circuit (not shown) the output of which is connected both to the corresponding gyro drive amplifier (not shown) and to the other input terminal of the resolver 72.

The shaft 35, indicative of the angle $\beta$ between the platform $y$ axis and the aircraft axis, is connected to one terminal of a mechanical differential 73. Another terminal is connected to the shaft 74, which is also connected to the rotor of the resolver 72. Assuming for the moment that shaft 74 is positioned at the angle $\alpha$ (the angle between the $y$ axis and the ground track), the shaft 75, connected to the remaining terminal of the differential, will be positioned at the angle $\delta = \alpha + \beta$. The shaft 75 is also connected to the rotor of a synchro transmitter 76, the three wire output of which is connected to a synchro control transformer 77. The rotor of control transformer 77 is positioned by the shaft 78 (connected to the motor 65 and the antenna array 61) with the result that if the positions of shafts 75 and 78 are not identical an error signal will appear on the rotor winding of control transformer 77. This error signal controls a servo amplifier 79 which in turn controls a motor 81 connected to the shaft 74, thereby positioning the shaft 74 at the angle $\alpha$.

Since the inputs to resolver 72 are $V_x$ and $V_y$ and since the rotor is positioned at the angle $\alpha$, the outputs are voltages proportional to ground track velocity as determined by the inertial system ($V_{TI}$) and proportional to velocity perpendicular to ground track ($V_{CTI}$). The voltage proportional to ($V_{TI}$) is compared with the ground speed voltage as determined by the Doppler system ($V_T$) in a subtracting circuit 82 and the difference led to one input terminal of a resolver 83, the rotor of which is also positioned by the shaft 74. The voltage proportional to ($V_{CTI}$) is led to the other input terminal of resolver 83 so that the output comprises two voltages representing the error in the determination of velocity in the $x$ and $y$ direction. The ($V_x$) error signal is connected to both a damping circuit 84 and a tuning circuit 85. The output of the damping circuit 84 is connected as an additional input to the integrator 71, while the output of the tuning circuit 85 is connected to an input of the gyro drive amplifier 57. The amplifier 57 applies a torque to the gyroscope 31 thereby leveling the platform by means of the circuitry previously described in connection with FIGS. 1 and 3.

Let us consider the inertial system alone, assuming that the damping circuit 84 and the tuning circuit 85 are disconnected. It can be seen that the inertial system includes a closed loop comprising the accelerometer 49, the integrator 71, the gyro drive amplifier 57, the gyroscope 31 and the platform 27. As in any closed loop, a disturbance anywhere in the system gives rise to error signals which tend to restore the equilibrium conditions. In general, the restoring forces generated by the error signals will cause the system to overshoot the equilibrium position and to oscillate about this position, the frequency or period of the oscillations depending upon the characteristics of the system. It is well known that best operation of an inertial system occurs when the characteristics of the loop are selected so that the loop oscillates at the Schuler frequency, or with a period of approximately 84 minutes. Therefore, the gains of the various amplifiers in the loop, such as those in the integrator 71 and the gyro drive amplifier 57, are adjusted so that the inertial loop is Schuler tuned, that is, has a period of approximately 84 minutes.

The combined Doppler inertial system is also seen to include a loop comprising the accelerometer 49, the integrator 71, the resolver 72, the subtraction circuit 82, the resolver 83, the tuning circuit 85, the gyro drive amplifier 57, the gyroscope 31 and the platform 27. Mathematical analysis suggests, and experimental results confirm, that excellent results can be obtained by tuning this loop to a period of about one twentieth of the Schuler period or about four minutes. Accordingly, the gains, both positive and negative, in the entire loop are considered and the gain of the tuning circuit 85 is adjusted to make the period of the entire loop approximately four minutes.

The damping circuit 84, connecting the error signal to the input of the integrator 71, has an effect analogous to that of the usual rate feedback and controls the damping of the loop oscillations.

In addition to the basic circuit above described, two correcting voltages are applied to the system. A signal proportional to the rate of rotation of the earth is generated by the circuit 87 and applied to the gyro drive amplifier 57. The Coriolis effect is compensated for by a circuit 88 which applies a suitable signal to the integrator 71. The circuits 87 and 88 may, for example, be similar to those described in the aforementioned copending application Serial No. 390,338, now Patent No. 2,914,763.

In FIG. 5, the circuitry associated with the $y$ axis of the platform has been omitted because it is identical to that of the $x$ axis. It will be understood that an additional integrator comparable to integrator 71 is required and that the $V_y$ error signal from resolver 83 is applied through additional circuitry like that above described for the $V_x$ error signal.

The operation may be summarized by noting that the Doppler system operates independently of the inertial system and provides the useful outputs $V_T$ and $\delta$ which may be utilized in various ways such as to operate indicators or as inputs to a position and course computer. In the inertial system, the accelerometers 48 and 49 sense both accelerations of the aircraft and the acceleration due to the gravity but cannot distinguish between them. The indicated accelerations are integrated to obtain velocities which are compared with the outputs of the Doppler system. The resulting error signals are used to adjust the orientation of the platform 27 until the indications of the Doppler and inertial systems are identical at which time the connections may be changed to the normal mode of operation.

*Normal Mode*

In the normal mode of operation, the inertial components are intimately interconnected with certain components of the Doppler system, especially those components comprising the frequency tracker. The frequency tracker per se is not a part of the present invention and several kinds are known and have been described. See, for example, the copending application of Gray, Newsom and Crane, Serial No. 312,306, filed October 11, 1952 for Automatic Signal Frequency Tracker, now Patent No. 2,856,519, or the copending application of Newsom and Huntington, Serial No. 371,608 filed July 31, 1953 for Frequency Tracker, now Patent No. 2,896,074. The present invention is not limited to the use of any particular frequency tracker, but one has been selected for illustrative purposes and will be described herein sufficiently so that the present invention can be understood.

Figure 6:
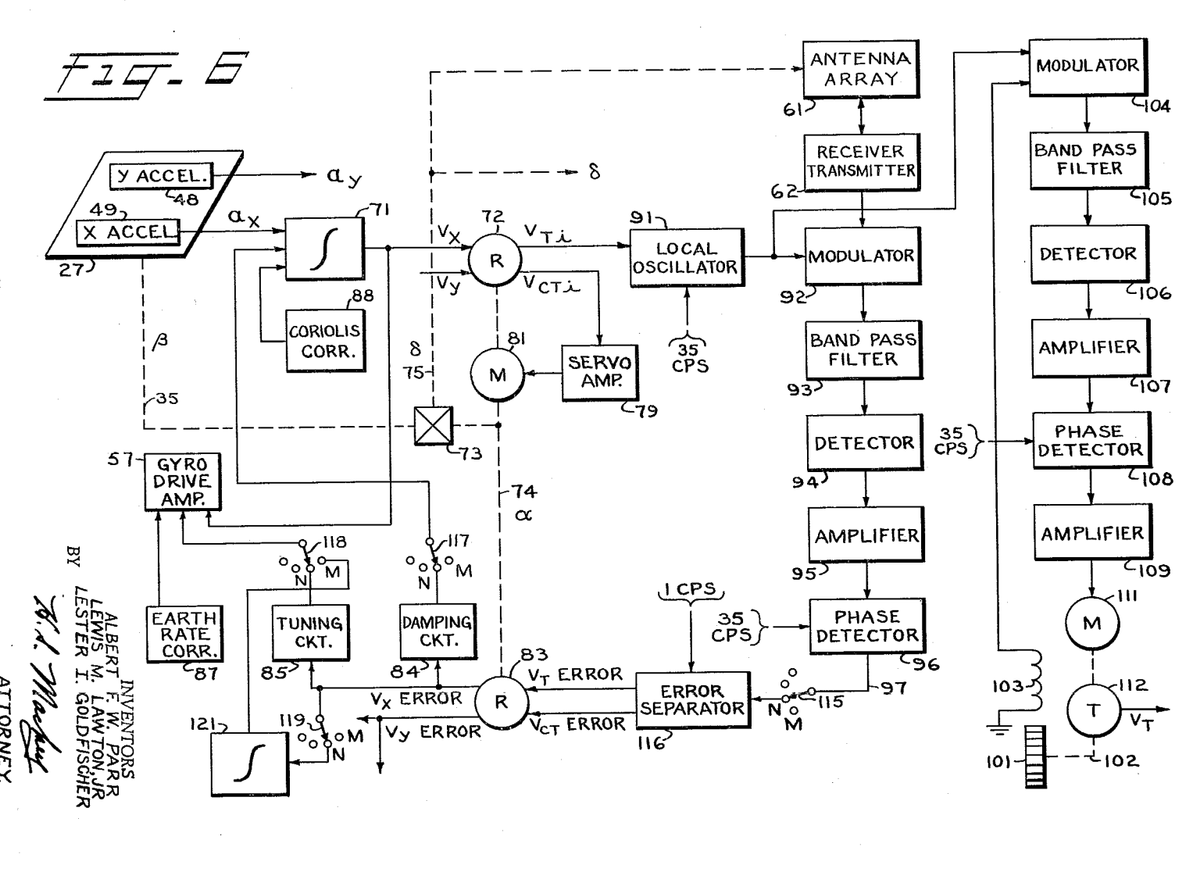
FIGURE 6 is a diagram showing the circuit connections for the normal mode of operation.
Figure 7A:
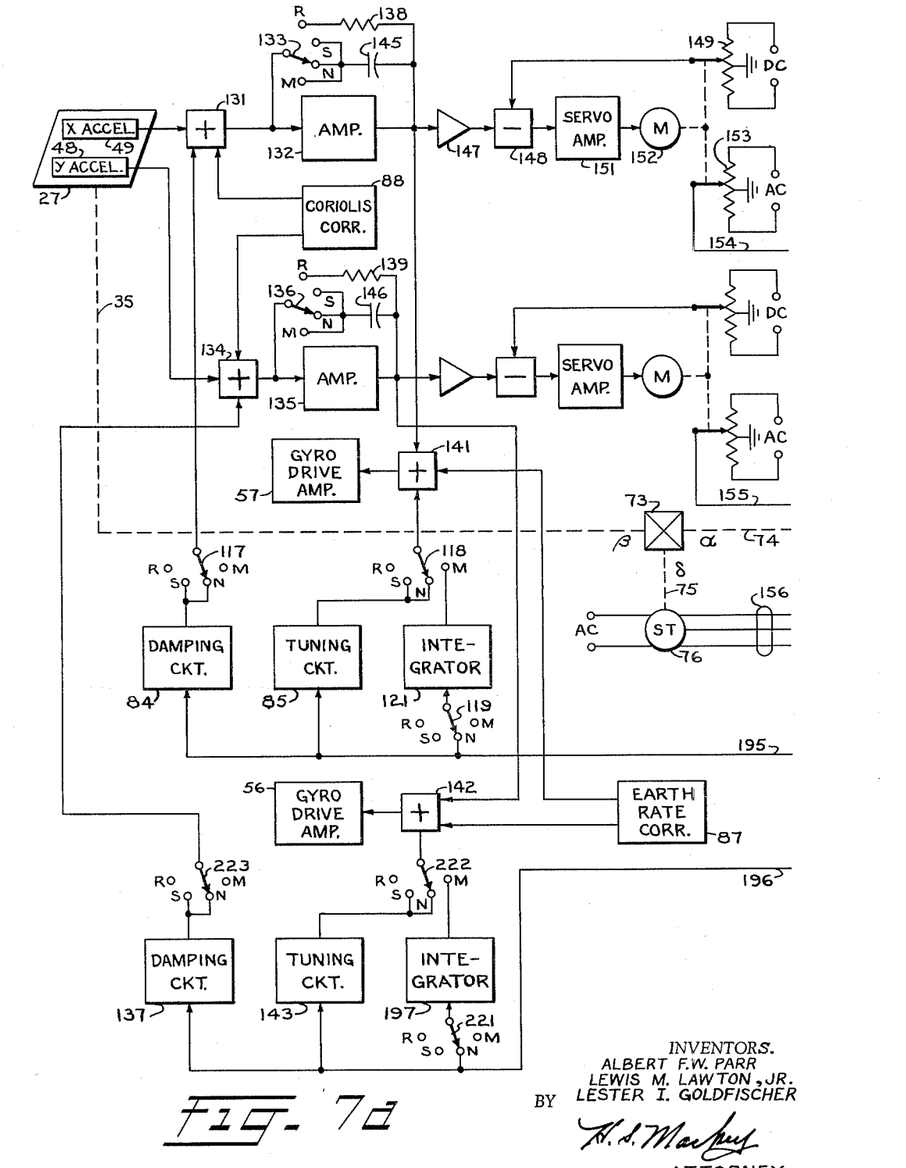
FIGURES 7a and 7b, taken together, show a schematic diagram of the system including the switches by which the various modes of operation may be selected.
Figure 7B:
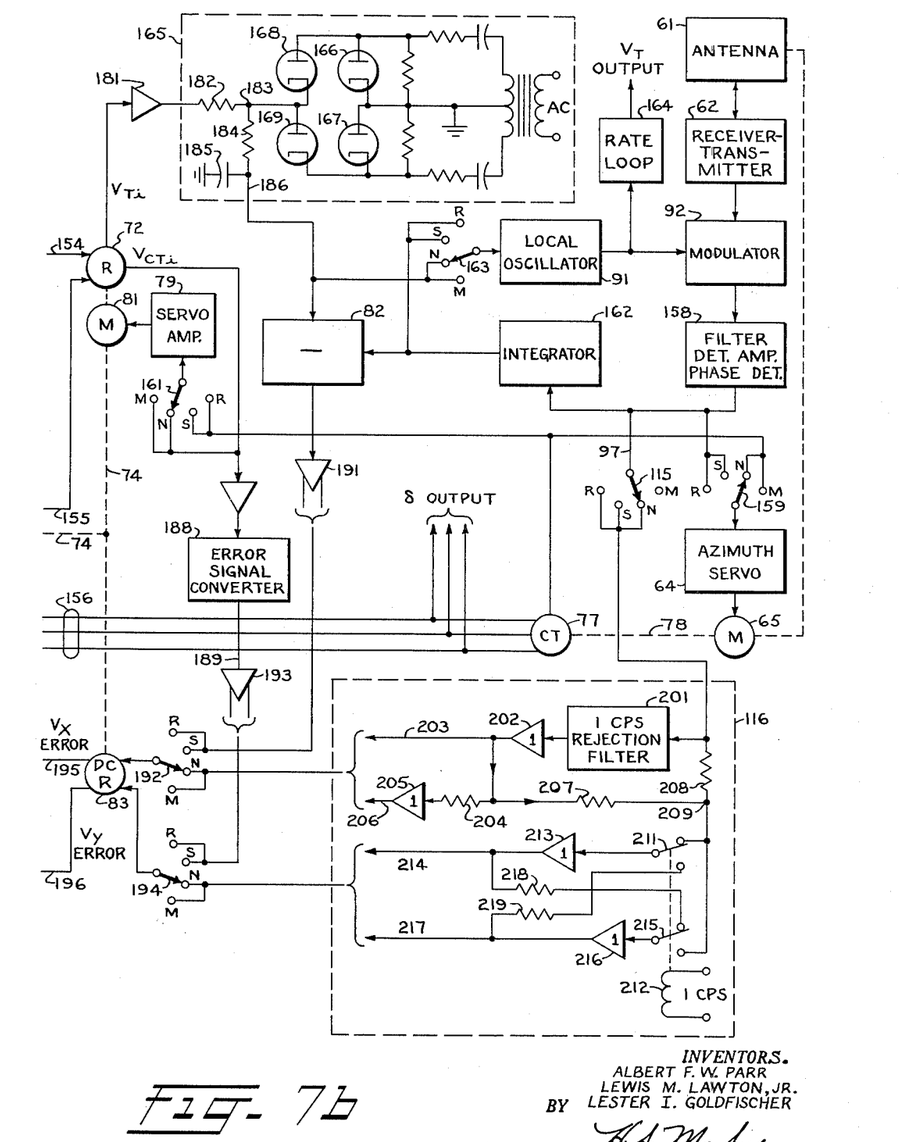

Referring now to FIG. 6, there is shown the antenna array 61 and the receiver-transmitter 62 which cooperate in transmitting the four beams previously discussed, receiving the reflected energy, and deriving two voltages time shared on a single channel having frequencies equal to the difference in frequency between the fore and aft returns of each pair of beams. A local oscillator 91 has its frequency adjusted by two signals, the first of which shifts the output frequency abruptly by about 10% at a fixed rate such as 35 c.p.s., and the second of which adjusts the mean frequency to a value 25 kc. above that of the output of the receiver-transmitter 62. The outputs of the local oscillator 91 and the receiver-transmitter 62 are mixed in a modulator 92 and then passed through a 25 kc. band pass filter 93.

Assume for the moment that the antenna 61 is aligned with the ground track so that the two signals from the receiver have the same frequency. Under these conditions the output of the modulator 92 will shift up and down in frequency at a rate of 35 c.p.s. because of the frequency modulation of the local oscillator 91. If the two frequencies do not lie above and below 25 kc. by equal amounts, one will be attenuated more than the other and the magnitude of the output of the filter 93 will be amplitude modulated at 35 c.p.s. The envelope is recovered by passing this output through a detector 94 after which it is amplified by an amplifier 95 and passed to a phase detector 96 where it is phase detected against a 35 c.p.s. reference to derive a direct current signal on conductor 97 which, by its polarity and magnitude, represents the sense and amount by which the mean frequency of local oscillator 91 differs from 25 kc. plus the Doppler frequency from receiver 62. In a pure Doppler system, this error signal on conductor 97 would be passed through an integrator and then used to control the local oscillator, but in the present invention it is interconnected with the inertial system, as will be more fully explained.

With the frequency tracker as so far described, the local oscillator 91 has a mean frequency 25 kc. above the Doppler signal and in order to derive an indication of the Doppler frequency itself, an additional loop designated the rate loop is provided. A toothed magnetic wheel 101 mounted on a shaft 102 has associated with it a pickup coil 103 which has a voltage induced in it the frequency of which is proportional to the rate of rotation of the shaft 102. The voltage of pickup coil 103 is mixed in a modulator 104 with the output of the local oscillator 91. The output of modulator 104 is passed through a 25 kc. band pass filter 105, a detector 106, an amplifier 107 and a phase detector 108 all of which operate in much the same way as the like components in the loop previously described to derive a unidirectional error signal indicative of the deviation of the frequency of the pickup coil 103 from that of the local oscillator minus 25 kc. This error signal controls an amplifier 109 which in turn varies the speed of a motor 111 on shaft 102 until the error signal vanishes. The frequency of the pickup coil 103 is then equal to the Doppler frequency and can be used as an output, or, if desired, a tachometer 112 may be connected to the shaft 102 so as to provide an output voltage the magnitude of which is proportional to the ground track speed, $V_T$.

So far the generation of an error signal indicative of the deviation of the antenna from ground track has not been discussed. Let it be assumed that the antenna is misaligned so that the output of the receiver 62 comprises voltages of different frequencies, shifting from one frequency to the other at the one c.p.s. rate corresponding to the shifting of the two pairs of beams. Let it also be assumed that the local oscillator is properly following the signal, that is, that its mean frequency is equal to the average of the two frequencies from receiver 62 plus 25 kc. Under these conditions the output of the phase detector 96 will shift up and down abruptly at the one c.p.s. rate, the phase and magnitude of this square wave representing the deviation of the antenna from the ground track. In a pure Doppler system this error signal would be used to position the antenna but in the present invention it is connected to the inertial system as will be more fully explained.

It can be seen, then, that the conductor 97 bears two superimposed error signals, the first being a unidirectional voltage representing, by its polarity and magnitude, the deviation of the mean frequency of the local oscillator 91 from 25 kc. plus the average frequency from the receiver 62, and the second being a one c.p.s. square wave representing, by its phase and magnitude, the deviation of the antenna 61 from alignment with the ground track direction.

Turning now to the inertial components, the $x$ accelerometer 49 is connected to the integrator 71 the output of which represents velocity in the $x$ direction ($V_x$) and is connected to one input of the resolver 72. Similarly, the $y$ accelerometer 48 is connected to another integrator (not shown) the output of which ($V_y$) is connected to the other input of the resolver 72. The resolver 72 rotates the coordinates of the velocity signals and, if the shaft of the resolver 72 were positioned at the angle $\alpha$, the outputs would represent velocity along the ground track ($V_{T1}$) and velocity perpendicular to ground track ($V_{CT1}$). The latter velocity should, of course, be zero and therefore this signal may be used as an error signal to position the shaft of the resolver 72 at the angle $\alpha$. Accordingly, the ($V_{CT1}$) output is connected to the input of the servoamplifier 79 which controls the motor 81 the shaft 74 of which is connected to the resolver 72. The ground track velocity signal from resolver 72 controls the frequency of the local oscillator 91 and if this frequency is not 25 kc. plus the Doppler frequency, an error signal appears on conductor 97.

The differential 73 has one input positioned in accordance with the angle $\alpha$ by connection to the shaft 74 and the other input positioned in accordance with the angle $\beta$ by connection to the shaft 35 so that the output shaft 75 represents the drift angle, $\delta$, and positions the antenna 61. If the antenna is not aligned with the ground track, an error signal appears on conductor 97.

The conductor 97 is connected through a switch 115 to an error signal separating circuit 116, the details of which will be discussed later, which serves to separate the one c.p.s. square wave error signal from the unidirectional error signal and to derive two error signals representing ground track velocity error and cross track velocity error. These error signals are coordinate rotated by the resolver 83 on the shaft 74 into error signals in the $x$ and $y$ directions. The $x$ error signal ($V_x$ error) is connected to the damping circuit 84 and the tuning circuit 85 as before. The damping circuit 84 is connected through a switch 117 to the integrator 71 while the tuning circuit 85 is connected through a switch 118 to the gyro drive amplifier 57. Compensation for the travel of the aircraft over the earth's curved surface is obtained as before by connecting the output of the integrator 71 to the gyro drive amplifier 57. The Coriolis correction circuit 88 and the earth rate correction circuit 87 are connected as before. It will be understood that the $y$ velocity error signal ($V_y$ error) is connected through damping and tuning circuits similar to those shown for the $V_x$ error signal.

In operation, the accelerometers 49 and 48 determine accelerations in the $x$ and $y$ directions which are integrated to obtain velocities and then resolved to obtain indications of ground track velocity and drift angle. The ground track velocity indication controls the local oscillator which in turn controls the rate loop of the frequency tracker which generates the useful ground track velocity output while the drift angle indication positions the antenna. The main loop of the frequency tracker generates error signals on conductor 97 representing the difference between ground track velocity and drift angle as measured by the inertial and Doppler systems. These error signals in turn control the leveling of the platform 27 so that the outputs of the inertial and Doppler components are made equal. As in the case of the set up mode, the period of the Doppler-inertial loop is made to be about four minutes.

*Memory Mode*

The measurement of ground track velocity and drift angle by the Doppler system is, of course, dependent upon the transmission and reception of electromagnetic energy and conditions may arise which make such transmission and reception impossible or inadvisable. For example, atmospheric conditions or the nature of the terrain over which the aircraft is passing may make the signal-to-noise ratio so low that the measurements are temporarily unreliable or the tactical situation may require periods of radar silence. During such periods it is highly desirable to maintain the flow of navigation data uninterrupted so that the position computer will continue to function. Therefore a fourth or memory mode of operation is provided. Memory modes as such have been used in the past, often providing for computation of the wind velocity vector during normal operation and utilizing remembered wind values during memory. The present invention renders unnecessary the computation of the wind velocity vector and substitutes therefor remembered values of gyroscope drift rates.

As shown in FIG. 6, the outputs of resolver 83 are error signals representing the difference between Doppler and inertial measurements. The principal source of error giving rise to these signals is random drift of the gyroscopes 31 and 32 and therefore these error signals comprise principally gyro drift rates. Circuits are provided for averaging and storing these drift rates for use during memory. The $x$ error signal is connected through a switch 119 to an integrator 121 the output of which may be connected by the switch 118 to the gyro drive amplifier 57 in place of the output of tuning circuit 85. A similar circuit (not shown) is provided for the $y$ error signal.

During normal operation, the $x$ and $y$ error signals are averaged and stored but no use is made of the stored values. Memory operation is initiated by throwing the switches 115, 117, 118 and 119 to the "M" positions. Switch 115 thus interrupts the flow of information from conductor 97 to the error separator 116, switch 119 removes the input from integrator 121, switch 117 disconnects the damping circuit 84, and switch 118 connects the gyro drive amplifier 57 to integrator 121 instead of to the tuning circuit 85. As a result, the gyroscope 57 has a precessing torque applied which is approximately proportional to the average value of its random drift rate, averaged over a period of time determined by the constants of the integrator 121. At the same time, the elimination of the damping and tuning circuits 84 and 85 restores the period of the loop to the Schuler value of approximately eighty four minutes. The system then operates as a pure inertial system and output data continues its flow uninterrupted. The outputs of resolver 72 continue to position the shaft 75 and to control the local oscillator 91 which in turn controls the rate loop and the output of tachometer 112.

*Complete Diagram*

FIGS. 7a and 7b taken together show the complete system including fourteen four position switches by which the desired mode of operation—Rapid, set-up, normal or memory—may be selected. All fourteen switches are preferably ganged for simultaneous operation and may be actuated manually or automatically. In the description of the various modes it will be assumed that the switches have been thrown to the appropriate position for the mode being described. FIGS. 7a and 7b also show some circuit details not shown in FIGS. 3, 5 and 6.

Referring now to FIGS. 7a and 7b, there is shown the platform 27 with the two accelerometers 49 and 48 mounted thereon and connected respectively through adding circuits 131 and 134 to the inputs of amplifiers 132 and 135. The adding circuits 131 and 134 are to enable additional voltages to be impressed on the amplifiers. Correction voltages from the Coriolis correction circuit 83 are added in all modes and additional voltages are added in the set-up and normal modes. The amplifiers 132 and 135 are each direct coupled polarity reversing amplifiers with two feedback paths, one resistive and one capacitative, which may be selected by the switches 133 and 136. The output of the amplifiers 132 and 135 are connected through adding circuits 141 and 142 respectively to the gyro drive amplifiers 57 and 56. The adding circuits 141 and 142 enable correction voltages from the earth rate correction circuit 87 to be added in all modes and enable additional correction voltages to be added in the set-up, normal and memory modes.

In the rapid mode, the switches 133 and 136 select the resistive feedback paths of amplifier 132 and 135 thereby rendering them simple amplifiers. Their outputs therefore represent acceleration forces sensed by the accelerometers, which are passed through the adding circuits 141 and 142 to the gyro drive amplifiers 57 and 56, thereby erecting the platform quickly as previously explained.

In the set-up, normal and memory modes of operation the switches 133 and 136 place capacitors 145 and 146 in the feedback paths thereby converting amplifiers 132 and 135 to integrators. The outputs therefore represent velocities in the $x$ and $y$ directions and are direct current signals. However, alternating current signals are needed to drive resolver 72 and the signals are converted by means of servo circuits. The output of amplifier 132, which is now an integrator, is connected through a simple voltage amplifier 147 to a comparing or subtracting circuit 148 where the signal voltage is compared with the voltage from the slider of a grounded center tap potentiometer 149 which is excited by direct current. The difference voltage controls a servoamplifier 151 which in turn controls a motor 152 which positions the slider of potentiometer 149 so as to make its voltage equal the voltage from amplifier 147. The motor 152 also controls the slider of a potentiometer 153 which is excited by alternating current so that the potential of its slider, and conductor 154 connected thereto, is an alternating voltage the magnitude and phase of which correspond to the magnitude and polarity of the voltage on the slider of potentiometer 149 and which represents the magnitude and sign of the velocity in the $x$ direction, $V_x$. The output of amplifier 135 is connected to an identical servomechanism which operates to place an alternating voltage on conductor 155 the phase and magnitude of which represents velocity in the $y$ direction, $V_y$. Conductors 154 and 155 are connected to the input of the inductive resolver 72.

As before, the shaft 35, which represents the angle $\beta$ between the $y$ axis and the aircraft axis is connected to one input terminal of a mechanical differential 73 the other two terminals of which are connected to shafts 74 and 75. Shaft 74 is mechanically connected to resolvers 72 and 83 while shaft 75 is connected to a synchro control transformer 76. The synchro transformer 76 is excited with alternating current so that its output cable 156 bears 3-wire information representing the position of the shaft 75.

Considering first the set-up mode of operation, the Doppler system operates independently as previously explained. The signal from the receiver 62 is mixed with the output of the local oscillator 91 in the modulator 92 the output of which is passed through a chain of components indicated by the reference character 158. These components may be the same as those shown in FIG. 6 including a bandpass filter 93, a detector 94, an amplifier 95 and a phase detector 96. The output of the circuit 158 passes through a switch 159 to the azimuth servo 64 which controls the motor 65 the shaft of which positions the antenna 61 and the shaft 78. A synchro control transformer 77 is positioned by the shaft 78 and its stator windings are connected to the 3-wire cable 156 from which the useful drift angle output may be taken. The control transformer 77 serves to compare the position of the shaft 75 with that of shaft 78 and if they are not the same an error signal on the rotor of control transformer 77 is passed through a switch 161 to the servoamplifier 79 which controls the motor 81 thereby positioning the shaft 74.

The output of the circuit 158 is also passed to integrator 162 the output of which passes through the switch 163 to the local oscillator 91 thereby controlling the latter's frequency. The output of the local oscillator also controls the rate loop 164 which generates the useful ground track velocity output, $V_T$. The rate loop 164 may comprise the components shown at the right of FIG. 6.

Returning now to the inertial components, the outputs of resolver 72 are alternating current signals representing ground track velocity ($V_{TI}$), cross track velocity ($V_{CTI}$). The signal representing ground track velocity must be converted to a unidirectional signal and this is accomplished by means of an error signal converter 165.

The circuit 165 comprises a pair of diodes 166 and 167 connected in series across a source of alternating current. The cathode of diode 166 and the anode of diode 167 are joined together and grounded. A pair of diodes 168 and 169 are also serially connected across the same source. The ground track signal from resolver 72 is connected through a simple amplifier 181 and a resistor 182 to the junction 183 of the cathode of diode 168 and the anode of diode 169. The junction 183 is also connected to one terminal of resistor 184, the other terminal of which constitutes the useful output and which is also connected through a capacitor 185 to ground.

In operation, during the half cycle when the anodes of diodes 166 and 168 are positive, all of the diodes will conduct and the junction 183 will be clamped to ground potential regardless of the input signal. During the other half cycle of the alternating current excitation, none of the diodes will conduct and the junction 183 will be free to assume any potential dictated by the input signal. Therefore the useful output of conductor 186 will be a unidirectional voltage proportional to the magnitude of the alternating voltage input to amplifier 181.

The cross track velocity signal from resolver 72 is passed through an identical error signal converter 188 which generates a unidirectional error signal on conductor 189.

The output of the error signal converting circuit 165 appearing on conductor 186 represents ground track as determined by the inertial system and is compared in a subtracting circuit 82 with the output of integrator 162 which represents ground track velocity as determined by the Doppler system. The resulting signal is passed through an amplifier 191 which simply serves to generate a 2-wire balanced signal. This balanced error signal passes through a switch 192 to one input of the resolver 83. The resolver 83 operates on unidirectional signals and may comprise a conventional arrangement of sine and cosine potentiometers and requires a 2-wire balanced signal input. The cross track error signal on conductor 189 is passed through an amplifier 193 which generates a 2-wire balanced signal which is then passed through switch 194 to the other input of resolver 83. The resolver 83 serves to convert the error signals from ground track and cross track signals to $x$ and $y$ error signals on conductors 195 and 196. The error signal on conductor 195 is connected through the damping circuit 84, the tuning circuit 85 and the integrator 121 in the manner previously explained in connection with FIG. 5. The error signal on conductor 196 is connected to damping circuit 137, tuning circuit 143 and integrator 197, for similar purposes. The result is that the platform is leveled in accordance with these error signals.

Considering now the operation in the normal mode, the ground velocity signal on conductor 186 is connected through the switch 163 so as to control the local oscillator 91. The cross track velocity signal from resolver 72, which is an alternating current signal, is connected through switch 161 to the servoamplifier 79 which controls the motor 81 and thereby positions the shaft 74. The shaft 74 in turn operates through the differential 73 to control the position of shaft 75 on which is mounted the synchro control transformer 76 thereby placing on cable 156 a signal indicative of drift angle as determined by the inertial system. This signal is compared with the position of the antenna 61 in the synchro control transformer 77 and any difference in the two positions generates an error signal in control transformer 77 which passes through the switch 159 to the azimuth servo 164 which positions the antenna by means of motor 65. The effect of all this is that the antenna is positioned by the system.

If the local oscillator is not at the proper frequency, a unidirectional error signal will appear on conductor 97. If the antenna is not aligned with ground track, a one c.p.s. error signal will appear on conductor 97. These error signals pass through switch 115 to the error separating circuit 116 which separates the two error signals and derives a pair of 2-wire balanced signals which are passed through switches 192 and 194 to the resolver 83.

The circuit 116 operates as follows. The signal from conductor 97 is passed through a filter 201 which rejects the one cycle frequency but passes frequencies above and below. If, for example, the unidirectional signal on conductor 97 is positive, the output of the filter 201 will be positive. This signal is passed through a unity gain polarity reversing amplifier 202 so that its output on conductor 203 will be negative. The conductor 203 is one wire of the output and is also connected through a resistor 204 to another unity gain polarity reversing amplifier 205 so that its output on conductor 206 is positive. Since the potential of conductor 203 is a unidirectional potential of opposite polarity to the input on conductor 97, it is added to the signal on conductor 97 through resistors 207 and 208. The junction 209 of these resistors therefore is solely the one c.p.s. error signal indicating misalignment of the antenna. The junction 209 is connected to one terminal of the switch 211 operated by a solenoid 212 excited by a one c.p.s. source. The armature of switch 211 is connected through a unity gain polarity reversing amplifier 213 to one output conductor 214. The junction 209 is also connected to one terminal of a switch 215 the armature of which is connected through a unity gain polarity reversing amplifier 216 to the other output conductor 217. The output conductor 214 is also connected through resistor 218 to the other stationary contact of switch 215 while the output conductor 217 is connected through a resistor 219 to the other stationary contact of switch 211.

In operation, consider a moment of time when the square wave at junction 209 is positive. This signal will pass through switch 211 and the amplifier 213 making the conductor 214 negative. At the same time the negative potential of conductor 214 will pass through the resistor 218 and switch 215 to the amplifier 216 thereby making the potential of conductor 217 positive. At the next half cycle, the switches 211 and 215 will be thrown to the opposite position and the junction 209 will now bear a negative potential. This negative potential will pass through the switch 215 and the amplifier 216 thereby making the conductor 217 positive. This positive potential on conductor 217 will pass through the resistor 219 and the switch 211 to the amplifier 213 thereby making the potential on the conductor 214 negative. It is obvious that if the square wave had the opposite phase of that considered, the potential of the conductors 214 and 217 would be reversed.

The error signals on conductors 195 and 196 operate to level the platform in the manner previously explained.

The memory mode of operation operates as previously explained in connection with FIG. 6. In addition to the switches shown in FIG. 6, FIG. 7a shows the switch 221 which removes the input signal to integrator 197 during memory; the switch 222 which changes the input to adding circuit 142 from the tuning circuit 143 to the integrator 197; and switch 223 which removes the damping circuit 137 during memory.

In summary, it can be seen that the present invention is an improved Doppler inertial system capable of operating in several modes. In the rapid mode, the accelerometers torque the gyroscopes so as to erect the platform quickly. In the set-up mode, the Doppler system operates independently to provide the useful output and also adjusts the inertial system to make the velocity vector determinations of the two systems the same. In the normal mode, the two systems are interdependent. The memory mode is used if the Doppler system is unuseable for any reason and in this mode the inertial system determines the output quantities but is continuously corrected by remembered values of errors.

Although the invention has been described as applied to a specific embodiment, many modifications will occur to those skilled in the art. It is therefore desired that the invention be limited only by the true scope of the appended claims.

What is claimed is:

1. Apparatus for installation on a vehicle comprising, an inertial system capable of generating first quantities representing the velocity vector of said vehicle, a Doppler radar system capable of generating second quantities also representing said velocity vector, and means for selectively interconnecting the two systems to operate in either a first or a second mode, said first mode including means for causing said Doppler system to operate independently and to generate useful output quantities representing said velocity vector which output quantities are compared with said first quantities and the difference used to control said inertial system, and said second mode including circuit means by which said first quantities control said Doppler system which in turn generates both useful output signals and error signals representing the difference between said first and second quantities and also including means responsive to said error signals for controlling said inertial system, whereby the useful output quantities represent said velocity vector as determined by both systems.

2. Apparatus for installation on a vehicle for obtaining navigational data comprising, an inertial system for deriving quantities representing the velocity vector of said vehicle, a Doppler radar system for comparing said quantities with values representing the velocity vector of said vehicle as determined by said Doppler system and for generating error signals representing the difference between said quantities and said values, integrating means for accumulating said error signals as generated, and switch means for establishing connections for selectively controlling said inertial system either by said error signals or by the output of said integrating means.

3. Apparatus for installation on a vehicle for obtaining navigational data comprising, an inertial system for deriving quantities representing the velocity vector of said vehicle, a Doppler radar system including an antenna and an oscillator, said Doppler system operating to generate a first error signal when the orientation of said antenna deviates from the ground track direction of said vehicle, said Doppler system also operating to generate a second error signal when the frequency of said oscillator deviates from a predetermined relationship to the ground speed of said vehicle, storage means for integrating each of said error signals with respect to time and switch means for selectively controlling said inertial system either by said error signals or by the output of said storage means.

4. Apparatus for installation on a vehicle for obtaining navigational data comprising, an inertial system for deriving quantities representing the velocity vector of said vehicle, a Doppler radar system including an antenna and an oscillator, said Doppler system operating to generate a first error signal when the orientation of said antenna deviates from the ground track direction of said vehicle, said Doppler system also operating to generate a second error signal when the frequency of said oscillator deviates from a predetermined relationship to the ground speed of said vehicle, means responsive to said quantities for controlling both the orientation of said antenna and the frequency of said oscillator, and means responsive to said error signals for controlling said inertial system.

5. Apparatus for installation on a vehicle for obtaining navigational data comprising, an inertial system including a gyroscopically stabilized platform having accelerometer means mounted thereon for deriving quantities representing the ground speed and drift angle of said vehicle, a Doppler radar system including an antenna rotatable in azimuth and a variable frequency oscillator, said Doppler system operating to generate a first error signal when the azimuth of said antenna deviates from the ground track direction of said vehicle, said Doppler system also operating to generate a second error signal when the frequency of said oscillator deviates from a predetermined relationship to the ground speed of said vehicle, means for controlling the azimuth of said antenna in accordance with said quantity representing drift angle, means for controlling the frequency of said oscillator in accordance with said quantity representing ground speed, and means responsive to said first and second error signals for controlling said platform.

6. Apparatus for installation on a vehicle for deriving navigational data comprising, an inertial system for deriving analog representations of the ground speed and drift angle of said vehicle, a Doppler radar system including a transmitter, a receiver, and an antenna system rotatable about a vertical axis, said radar system operating to produce two alternating voltages time shared on a single transmission channel, the difference in the frequencies of said voltages representing the deviation in alignment of said antenna system with the ground track of the vehicle and the average frequency of said voltages representing the ground speed of the vehicle, means for angularly positioning said antenna system in accordance with the said analog representation of drift angle, a variable frequency oscillator, means for controlling the frequency of said oscillator by said analog representation of ground speed, a modulator for mixing the output of said oscillator with said two alternating voltages on said single transmission channel, and means responsive to the output of said modulator for correcting said inertial system.

7. An airborne navigation data system comprising, an inertially stabilized horizontal platform, means for continuously determining a first angle which is the angle between a reference direction on said platform and the longitudinal axis of the aircraft, first and second accelerometers mounted on said platform, one of said accelerometers being responsive to accelerations in said reference direction and the other accelerometer being responsive to accelerations at right angles to said reference direction, means for integrating the output of each of said accelerometers to obtain first and second voltages proportional to the components of the velocity of the aircraft in said directions, means for resolving said first and second voltages to obtain a third voltage proportional to the velocity of the aircraft along its ground track and for obtaining a representation of a second angle which is the angle between said reference direction and the ground track of the aircraft, a transmitter, a horizontally stabilized antenna rotatable in azimuth, said transmitter and antenna cooperating to transmit two pairs of beams of electromagnetic energy in different directions from the aircraft to the ground, means in different directions from the aircraft to the ground, means for controlling the azimuth of said antenna in accordance with the difference between said second and first angles, a receiver for receiving energy reflected from the ground and for deriving therefrom fourth and fifth voltages time shared on a single transmission channel, said fourth and fifth voltages each being equal in frequency to the difference between the received frequencies of the beams of one of said pairs, an oscillator adjustable in frequency, means for controlling the frequency of said oscillator by said third voltage, a modulator for mixing said fourth and fifth voltages on said transmission channel with the output of said oscillator, and means responsive to the output of said modulator for correcting the stabilization of said platform.

8. An airborne navigation data system comprising, a gyroscopically stabilized horizontal platform, means for continuously determining a first angle which is the angle between a reference direction on said platform and the longitudinal axis of the aircraft, first and second accelerometers mounted on said platform, one of said accelerometers being responsive to accelerations in said reference direction and the other accelerometer being responsive to accelerations at right angles to said reference direction, means for integrating the output of each of said accelerometers to obtain voltages proportional to the velocities of the aircraft in said two directions, means for resolving said voltages to obtain a voltage proportional to the velocity of the aircraft along its ground track and for obtaining a second angle which is the angle between said reference direction and the ground track of the aircraft, a radar system including a transmitter, and an antenna mounted on a horizontally stabilized platform controllable in azimuth, said transmitter and antenna transmitting two pairs of beams of electromagnetic energy from the aircraft to the ground, means for controlling the azimuth of said antenna in accordance with the difference between said second and first angles, a receiver for receiving energy reflected from the ground and for deriving two voltages time shared on a single transmission channel at a first low frequency, said voltages being equal in frequency to the difference between the received frequencies of the two beams of each pair respectively, an oscillator adjustable in frequency, means for controlling frequency of said oscillator in response to the velocity along the ground track as determined by said accelerometers, means for repeatedly and abruptly altering the frequency of said oscillator at a second low frequency, a modulator for mixing the signal from said transmission channel with the output of said oscillator, a bandpass filter, a detector, and a phase detector operated at said second low-frequency connected in that order to the output of said modulator, whereby the output of said phase detector comprises two error signals, the first error signal being at said first low frequency and indicative of the deviation of said antenna from alignment with the ground track of the aircraft and said second error signal being unidirectional and indicative of the difference between the ground speed of the aircraft as determined by said accelerometers and as determined by said radar system, and means responsive to said error signals for correcting the stabilization of said gyroscopically stabilized platform.

9. Apparatus for installation on a vehicle for obtaining navigational data comprising, a normally horizontal platform, gyroscopic means for stabilizing said platform, accelerometer means mounted on said platform and responsive to acceleration forces in two orthogonal directions parallel to said platform, and switch means for establishing either a first circuit by which said accelerometer means controls said gyroscopic means to erect said platform to horizontality or a second circuit by which quantities representing the velocity vector of said vehicle are derived from said accelerometer means.

10. Apparatus for installation of a vehicle for obtaining navigational data comprising, a normally horizontal platform, gyroscopic means for stabilizing said platform, accelerometer means mounted on said platform and responsive to accelerations in two orthogonal directions both parallel to said platform, and switch means for establishing either a first circuit or a second circuit, said first circuit including means responsive to the output of said accelerometer means for applying precessing torques to said gyroscopic means whereby said platform is brought to horizontality, said second circuit including means for integrating the output of said accelerometer means with respect to time whereby quantities are derived which represent the velocity vector of said vehicle.

11. Apparatus for installation on a vehicle for obtaining navigational data, comprising, an inertial system for deriving first quantities representing the velocity vector of said vehicle, a Doppler radar navigation data system capable, when operating independently, of generating second quantities representing the velocity vector of said vehicle, means utilizing said first quantities for controlling said Doppler system to generate error signals indicative of the difference between said first and said second quantities, and means responsive to said error signals for controlling said inertial system to reduce said error signals to zero.

References Cited in the file of this patent

UNITED STATES PATENTS 2,752,792    Draper ________________ July 3, 1956

OTHER REFERENCES

Inertial Navigation, Parts I to IV published in Aviation Week, Jan. 2, 9, 16 and 23, 1956, respectively.